United States Patent
Lu et al.

(10) Patent No.: US 9,802,611 B1
(45) Date of Patent: Oct. 31, 2017

(54) OFF-ROAD AUTONOMOUS DRIVING

(71) Applicant: Ford Global Technologies, LLC, Dearborn, MI (US)

(72) Inventors: Jianbo Lu, Northville, MI (US); Davor David Hrovat, Ann Arbor, MI (US); Hongtei Eric Tseng, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/145,900

(22) Filed: May 4, 2016

(51) Int. Cl.
| | |
|---|---|
| *B60W 30/00* | (2006.01) |
| *B60W 30/18* | (2012.01) |
| *B60W 10/22* | (2006.01) |
| *B60W 50/14* | (2012.01) |
| *B60W 50/10* | (2012.01) |
| *B60W 10/20* | (2006.01) |
| *B60W 10/18* | (2012.01) |
| *B60W 10/06* | (2006.01) |

(52) U.S. Cl.
CPC ............ *B60W 30/18* (2013.01); *B60W 10/06* (2013.01); *B60W 10/18* (2013.01); *B60W 10/20* (2013.01); *B60W 10/22* (2013.01); *B60W 50/10* (2013.01); *B60W 50/14* (2013.01); *B60W 2300/185* (2013.01); *B60W 2550/10* (2013.01)

(58) Field of Classification Search
CPC ...... B60W 30/18; B60W 10/06; B60W 10/18; B60W 10/20; B60W 10/22; B60W 50/10; B60W 50/14; B60W 2300/185; B60W 2550/10
See application file for complete search history.

(56) References Cited

U.S. PATENT DOCUMENTS

| | | | | |
|---|---|---|---|---|
| 5,414,625 | A * | 5/1995 | Hattori | G05D 1/0246 180/169 |
| 6,073,065 | A * | 6/2000 | Brown | B60G 17/0162 244/179 |
| 8,075,002 | B1 | 12/2011 | Pionke et al. | |
| 2001/0045308 | A1 * | 11/2001 | Foulk, Jr. | A61G 5/04 180/65.26 |
| 2004/0193349 | A1 * | 9/2004 | Flann | A01B 69/008 701/50 |
| 2004/0231904 | A1 * | 11/2004 | Beck | B60G 3/14 180/197 |
| 2004/0232632 | A1 * | 11/2004 | Beck | B60G 17/016 280/5.5 |
| 2005/0004732 | A1 | 1/2005 | Berry et al. | |
| 2007/0152427 | A1 * | 7/2007 | Olsen | A61G 5/046 280/649 |
| 2008/0086241 | A1 * | 4/2008 | Phillips | G05D 1/0038 701/2 |

(Continued)

*Primary Examiner* — Behrang Badii
*Assistant Examiner* — Daniel L Greene
(74) *Attorney, Agent, or Firm* — Frank A. MacKenzie; Bejin Bieneman PLC

(57) ABSTRACT

A vehicle system includes a processor with access to a memory storing instructions executable by the processor. The instructions include determining whether an autonomous host vehicle can traverse an environmental obstacle, and if the autonomous host vehicle can traverse the environmental obstacle, controlling an active suspension system in accordance with the environmental obstacle and controlling the autonomous host vehicle to traverse the environmental obstacle.

18 Claims, 4 Drawing Sheets

(56) References Cited

U.S. PATENT DOCUMENTS

| | | | |
|---|---|---|---|
| 2008/0162027 A1* | 7/2008 | Murphy | B60W 50/14 701/117 |
| 2008/0231011 A1* | 9/2008 | Bordini | B60G 9/022 280/124.112 |
| 2008/0243336 A1 | 10/2008 | Fitzgibbons | |
| 2013/0231814 A1* | 9/2013 | Sarokhan | B25J 9/1694 701/22 |
| 2014/0125018 A1 | 5/2014 | Brady et al. | |
| 2014/0195112 A1 | 7/2014 | Lu et al. | |
| 2015/0046032 A1* | 2/2015 | Clarke | B60G 17/0165 701/37 |
| 2015/0210290 A1 | 7/2015 | Hemes et al. | |
| 2015/0253775 A1* | 9/2015 | Jacobus | G05D 1/024 701/23 |
| 2015/0346722 A1* | 12/2015 | Herz | G05D 1/0038 701/2 |
| 2016/0001720 A1* | 1/2016 | Vadgama | B60R 16/037 701/2 |

\* cited by examiner

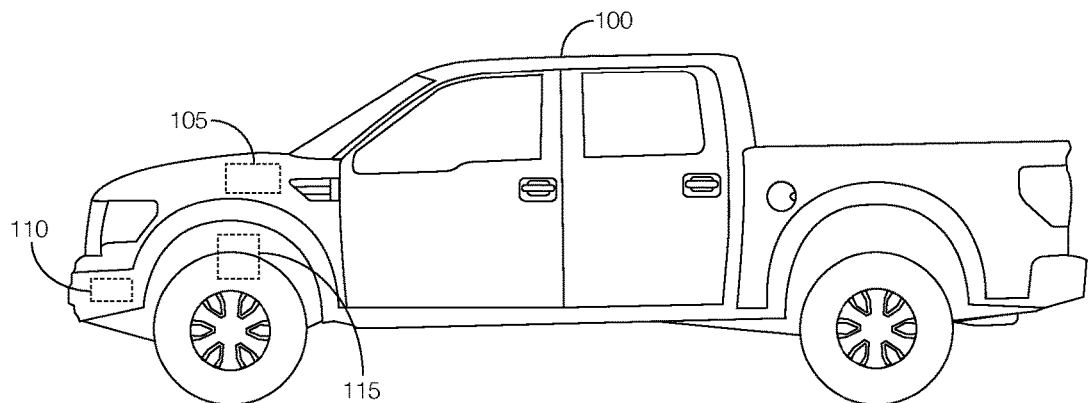
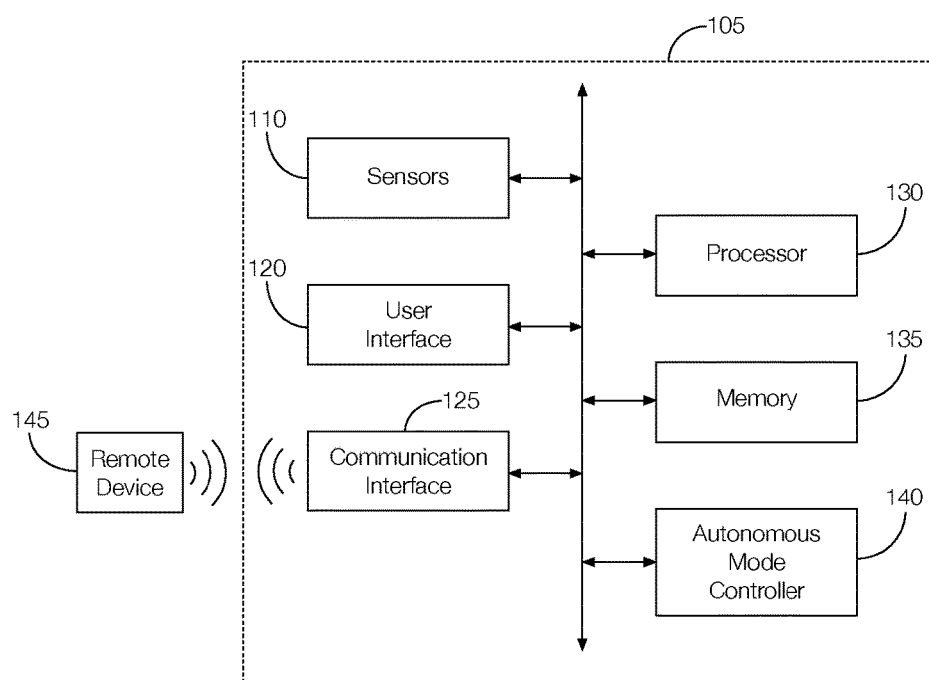
FIGURE 1
FIGURE 2

OFF-ROAD AUTONOMOUS DRIVING

BACKGROUND

Off-roading generally refers to operating a vehicle on an unpaved road. Thus, off-roading can occur on dirt, gravel, mud, rocks, sand, etc. For some, off-roading is a recreational activity. The driving surface, the type of vehicle, and the experience of the driver are all factors that contribute to the challenges of off-roading. Sometimes, vehicles are modified with particular features that help the vehicle traverse certain off-road conditions.

BRIEF DESCRIPTION OF THE DRAWINGS

FIG. 1 illustrates an example of an autonomous vehicle with a vehicle control system that can traverse various off-road obstacles.

FIG. 2 is a block diagram showing example components of the vehicle system.

DETAILED DESCRIPTION

Figure 3A:
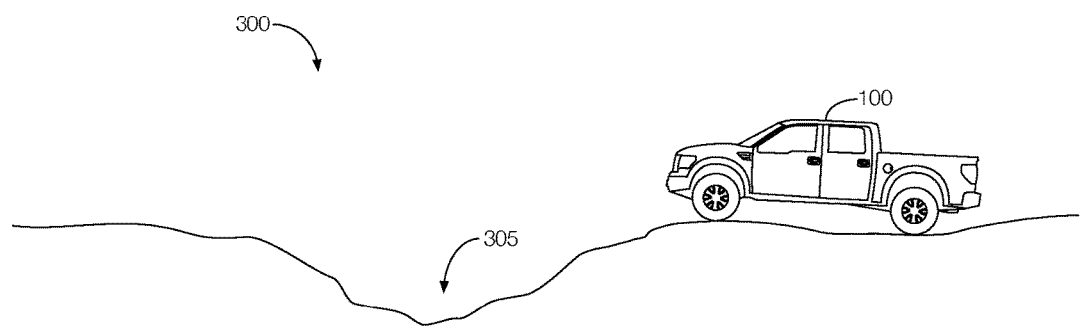
FIGS. 3A-3D illustrate example off-road environmental obstacles that can be traversed by the autonomous vehicle.

Vehicle suspension systems make traversing certain off-road environmental obstacles more manageable. For example, a fully active suspension can adjust various dynamic characteristics for off-road driving purposes. Examples of such characteristics include ride height, stiffness of the suspension springs, damping rates of the shock absorbers, rigidity of the anti-roll bars, characteristics of body mounts, the relative position between each individual wheel and the vehicle body, etc.

Fully active suspension systems can benefit from data captured via sensors. That is, the suspension system can adopt particular characteristics based on the environmental obstacles detected by the sensors. Moreover, the vehicle itself can assess the environmental obstacle relative to the capabilities of the vehicle to determine whether the vehicle can traverse the environmental obstacle. The vehicle may, in some possible situations, determine whether it should attempt to traverse the environmental obstacle without passengers. For example, if traversing a particular obstacle is within the capabilities of the vehicle but could cause a roll-over, the vehicle may alert the passengers of the risk and ask the passengers to exit the vehicle. The vehicle may autonomously traverse the environmental obstacle after the passengers have exited the vehicle.

An example vehicle control system, that could be incorporated into an autonomous host vehicle to carry out such actions, includes a processor with access to a memory storing instructions executable by the processor. The instructions include determining whether an autonomous host vehicle can traverse an environmental obstacle, and if the autonomous host vehicle can traverse the environmental obstacle, controlling an active suspension system in accordance with the environmental obstacle and controlling the autonomous host vehicle to traverse the environmental obstacle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the autonomous host vehicle 100 includes a vehicle system 105 (also referred to as a vehicle control system) that can autonomously navigate certain off-road environmental obstacles. Examples of environmental obstacles include ditches, rocks (of any size), stumps, branches, tree trunks, or any other object or naturally occurring land formation that the host vehicle 100 may need to drive over or through while off-roading. The environmental obstacle is detected by one or more on-board vehicle sensors 110. The vehicle system 105 determines whether the host vehicle 100 can traverse the environmental obstacle, and if so, controls an active suspension system 115 in accordance with the environmental obstacle and controls the autonomous host vehicle 100 to traverse the environmental obstacle.

The vehicle system 105 may apply different active suspension system 115 settings to different scenarios presented by the various environmental obstacles encountered. For example, if the environmental obstacle is a ditch, the vehicle system 105 applies active suspension system 115 settings associated with a ditch crossing mode. If the environmental obstacle includes large rocks (i.e., boulders), stumps, tree trunks, or other large objects, the vehicle system 105 applies active suspension system 115 settings associated with a rock crawling mode. If the environmental obstacle includes smaller rocks (i.e., smaller than a boulder but individually or collectively larger than the vehicle's ground clearance), stumps, tree trunks, or other smaller objects that individually or collectively are larger than the vehicle's ground clearance, the vehicle system 105 applies active suspension system 115 settings associated with a ground clearance avoidance mode.

The vehicle system 105 may combine these modes or other modes together depending on the environmental obstacles detected by the sensors 110. For instance, if the sensors 110 detect a ditch with a number of rocks that collectively exceed the vehicle's ground clearance height, the vehicle system 105 could apply active suspension system 115 settings for the ditch crossing mode and the ground clearance avoidance mode.

One way for the vehicle system 105 to detect the environmental obstacles is based on image processing. The image could be the output of the sensor 110, which could be implemented as one or more of a lidar sensor, a radar sensor, a camera, an ultrasound sensor, or the like. The vehicle system 105 processes the image to identify one or more environmental obstacles. Some environmental obstacles, and possibly characteristics of those obstacles, can be determined from other sources, such as map data. For instance, characteristics about a ditch, boulders, foothills, rock piles, trails, etc., can be determined from a topographical map.

In addition to detecting the environmental obstacle, the vehicle system 105 may determine how to autonomously navigate the environmental obstacle. This may include predicting the vehicle's path over or through the environmental obstacle while considering factors such as roll-over propensity, traction loss, loss of control, and other risk factors associated with traversing the environmental obstacle. The vehicle system 105 may consider the capabilities of the active suspension system 115 when assessing the risk factors. If the risk factors are too high (e.g., quantitatively above a maximum threshold), the vehicle system 105 instructs the operator to seek an alternate route or finds a different route for autonomous operation of the host vehicle 100. If the risk factors are quantitatively below the maximum threshold but above an intermediate threshold, the vehicle system 105 determines that the environmental obstacle should only be attempted autonomously and only after the passengers have exited the host vehicle 100. Under such circumstances, the vehicle system 105 will operate the host vehicle 100 autonomously through the environmental obstacle after all passengers have exited the host vehicle 100. If the risk factors are quantitatively below the intermediate threshold, the vehicle system 105 permits manual or autonomous operation of the host vehicle 100 through the environmental obstacle.

Although illustrated as a pickup truck, the vehicle may include any passenger or commercial automobile such as a car, a truck, a sport utility vehicle, a crossover vehicle, a van, a minivan, a taxi, a bus, etc. In some possible approaches, as discussed below, the vehicle is an autonomous vehicle configured to operate in an autonomous (e.g., driverless) mode, a partially autonomous mode, and/or a non-autonomous mode.

FIG. 2 illustrates example components of the vehicle system 105. As shown, the vehicle system 105 includes the sensors 110 (briefly discussed above, and discussed in greater detail below), a user interface 120, a communication interface 125, a processor 130, a memory 135, and an autonomous mode controller 140. The vehicle system 105 need not include all of these components, however. The vehicle system 105, for example, could include more, fewer, or different components than those shown and described.

The sensors 110 include any number of electronic circuits and other electronic components that capture information about the area around the host vehicle 100. Examples of sensors 110 include lidar sensors, radar sensors, ultrasonic sensors, cameras, or any combination thereof. Any number of sensors 110 may be incorporated into the host vehicle 100, and different sensors 110 may be of the same or different type relative to the others, if any, incorporated into the host vehicle 100. The sensors 110 are programmed to output signals representing the captured information. For instance, when implemented via lidar, radar, and cameras, the output of the sensor 110 includes image data. In some instances, the sensor 110 is programmed to detect environmental obstacles. This could be through image processing performed by the electronic control unit inside or outside the sensor 110. In such instances, the sensor 110 may output an obstacle detection signal indicating the presence of the environmental obstacle. The obstacle detection may include other data as well, such as characteristics of the environmental obstacle. Other types of sensors 110 that may be used to detect environmental obstacles could include a rain sensor, a road condition sensor, a tire pressure sensor, a height sensor, a steering wheel sensor, wheel speed sensors, longitudinal and lateral acceleration sensors, accelerator and brake pedal sensors, or the like.

The user interface 120 includes any number of electronic circuits and other electronic components that present information to, and receive user inputs from, the vehicle passengers. For instance, the user interface 120 may include a touch-sensitive display screen located in the passenger compartment of the host vehicle 100. The user interface 120 is programmed to receive signals from, e.g., the processor 130 and present information to the vehicle passengers in accordance with the signals received. Moreover, the user interface 120 is programmed to output signals representing user inputs. The signals may be output to, e.g., the processor 130 or other components of the vehicle system 105.

The communication interface 125 includes any number of electronic circuits and other electronic components that wirelessly transmit signals. The communication interface 125, for example, includes an antenna. The communication interface 125 is programmed to receive signals from the processor 130 and transmit those signals to nearby devices. Further, the communication interface 125 may receive signals from remote devices 145 and transmit those signals to, e.g., the processor 130, the autonomous mode controller 140, or the like.

The processor 130 may include any number of electronic circuits and other electronic components that control certain operations of the vehicle system 105 and possibly contribute to the control of other systems such as the active suspension system 115, the autonomous mode controller 140, or the like. For example, the processor 130 receives the signals output by the sensors 110. The processor 130 may receive the image data, the obstacle detection signal, or both. From the output of the sensor 110, the processor 130 determines whether the host vehicle 100 can autonomously traverse the environmental obstacle and whether the passengers should exit the host vehicle 100 prior to attempting to traverse the environmental obstacle. Further, the processor 130 outputs command signals to the active suspension system 115 that command the active suspension system 115 to adopt settings appropriate for the environmental obstacle. The processor 130 also outputs command signals to the autonomous mode controller 140 that will control the host vehicle 100 while traversing the environmental obstacle.

By way of example, the processor 130 may be incorporated into a vehicle dynamics control module that receives various sensor signals, including signals output by a rain sensor, a road condition sensor, a tire pressure sensor, a height sensor, a steering wheel sensor, wheel speed sensors, longitudinal and lateral acceleration sensors, accelerator and brake pedal sensors, or the like. The processor 130 may further receive signals, from an inertial measurement unit, associated with roll rate, yaw rate, pitch rate, longitudinal acceleration, lateral acceleration, and vertical acceleration. Other types of inputs to the processor 130 include signals generated by a pre-crash sensing system in accordance with radar, lidar, camera, or transponder sensors, signals generated by a navigation system, a vehicle-to-vehicle communication system, or a vehicle-to-infrastructure communication system.

The processor 130 may output various signals to other components of the host vehicle 100. For instance, the processor 130 may output signals to a driver warning system, a powertrain control system, a restraint control module, and a chassis control module. The chassis control module may implement the aforementioned active suspension system 115 by outputting control signals that simultaneously adjust, e.g., the suspension height, the suspension dynamic force, or the like. The restraint control module may control seatbelt pretensioners, interior airbag actuators, curtain airbag actuators, seat controls, rollover protection bar controls, external airbag actuators, etc. Moreover, in addition to the processor 130, the restraint control module may receive signals from impact crash sensors and interior and occupant sensors.

In response to a detected environmental obstacle, the processor 130 determines whether the host vehicle 100 is capable of traversing the environmental obstacle. This includes identifying the type of environmental obstacles involved (e.g., ditches, large rocks, small rocks, the amount of ground clearance, etc.), the capabilities of the active suspension system 115, the risk factors associated with traversing the environmental obstacle, etc. The processor 130 may compare a quantitative measure of the risk factors to the maximum threshold, the intermediate threshold, or both.

If the risk factors exceed the maximum threshold, the processor 130 commands the user interface 120 to alert the passengers to take a different route. The processor 130 may further output command signals to prevent autonomous and manual operation of the host vehicle 100 through or over the environmental obstacle. The processor 130 may further suggest an alternate route that avoids the environmental obstacle by consulting, e.g., a navigation system.

If the risk factors do not exceed the maximum threshold but exceed the intermediate threshold, the processor 130 commands the user interface 120 to present an alert to the occupants instructing the occupants that the host vehicle 100 cannot be manually driven over or through the environmental obstacle and that the host vehicle 100 will autonomously traverse the environmental obstacle only after all passengers have exited the host vehicle 100. The user interface 120 presents the alert in response to the command from the processor 130, and the alert may include instructions for initiating the autonomous operation of the host vehicle 100 via a remote device 145. When the signal from the remote device 145 is wirelessly received via the communication interface 125, or any other user input, such as a user input provided to the user interface 120, and passed to the processor 130, the processor 130 determines that it has the passenger's authorization to attempt to autonomously traverse the environmental obstacle. The processor 130 may rely on the user input as an indication that the passengers have exited or will exit the host vehicle 100 within a predetermined period of time. The processor 130 may further or alternatively consult an occupant detection system (e.g., seat sensors, interior camera, or the like) to confirm that all passengers have indeed exited the host vehicle 100 prior to initiating the autonomous control over or through the environmental obstacle. To initiate the autonomous control, the processor 130 generates control signals to apply particular settings to the active suspension system 115 based on the type of environmental obstacle detected. Further, the processor 130 generates control signals that command the autonomous mode controller 140 to follow a particular path to traverse the environmental obstacle.

If the risk factors do not exceed the intermediate threshold, the processor 130 commands the user interface 120 to prompt the passengers to select either manual or autonomous control over or through the environmental obstacle. The user input selecting either manual or autonomous control is received via the user interface 120 or the remote device 145 and provided to the processor 130. In response, the processor 130 generates the control signals for the active suspension system 115. If the user input indicates autonomous control, the processor 130 further generates the control signals for autonomous operation of the host vehicle 100 over or through the environmental obstacle.

The memory 135 includes any number of electronic circuits and other electronic components that store data. The data may include the images captured by the sensors 110, data relating environmental obstacles to different active suspension system 115 settings, instructions executable by the processor 130, instructions executable by the autonomous mode controller 140, or the like. The memory 135 may make such data available to the other components of the vehicle system 105.

The autonomous mode controller 140 includes any number of electronic circuits and other electronic components that control the host vehicle 100 in an autonomous or partially autonomous mode. The autonomous mode controller 140 may autonomously control the host vehicle 100 according to the signals output by the sensors 110, the signals output by the processor 130, a navigation system, or any combination of these or other components of the host vehicle 100. The autonomous mode controller 140 is programmed to output command signals to various systems within the host vehicle 100 such as the powertrain, brakes, steering, etc. The command signals output by the autonomous mode controller 140 may, therefore, navigate the host vehicle 100 over or through the environmental obstacle.

Moreover, the autonomous mode controller 140 may autonomously operate the host vehicle 100 according to the settings of the active suspension system 115 determined by the processor 130. That is, the autonomous mode controller 140 may receive a signal representing the particular settings of the active suspension system 115 applied according to the detected environmental obstacle or may access the settings from, e.g., a database stored in the memory 135. With the settings, the autonomous mode controller 140 may autonomously control the host vehicle 100 according to the limitations or advantages of characteristics of the active suspension system 115.

FIG. 3A illustrates an example ditch-crossing scenario 300, which occurs when the host vehicle 100 approaches a ditch 305. Ditches have various dimensions (width, depth, and length) that need to be considered. When the host vehicle 100 approaches a ditch, the vehicle system 105 may operate in a ditch crossing mode. The ditch crossing mode may be initiated via a user input provided to the user interface 120 or automatically by the processor 130 in accordance with sensor signals indicating the presence of the ditch.

The vehicle system 105 may execute a ditch crossing feasibility assessment. For instance, based on the signals output by the sensor 110, the processor 130 may assess the width and depth of the ditch relative to the approaching and departure angles of the host vehicle 100 and the down and up slope of the ditch to determine whether active suspension system 115 ride height adjustment can be used to match the approaching and departure angles. If the appropriate ride height adjustment is available, i.e., the approaching and departure angles are feasible for the host vehicle 100 to cross the ditch, the processor 130 may conduct a path planning process. For ditches that permit manual operation of the host vehicle 100, driver assist path information may be displayed via the user interface 120 to help the driver approach the ditch at a location where the host vehicle 100 is most likely to traverse the ditch (e.g., a path where no more than one tire is in the air or only no more than one tire is likely to lose traction at any particular time).

The vehicle system 105 may further implement actuation coordination while the host vehicle 100 is manually operated. That is, the processor 130 may output signals to adjust the active suspension system 115 to facilitate traction buildup, and the traction control may be controlled to allow more efficient traction management including locking the differential and increasing the throttle slightly if the wheels start to spin. Moreover, the processor 130 may regulate the speed of the host vehicle 100 via automatic cruise control by, e.g., selecting a slow target speed profile, which may be predefined for the ditch crossing mode.

In some possible approaches, the vehicle system 105 may autonomously operate the host vehicle 100 across the ditch in the ditch crossing mode. For instance, the autonomous operation of the host vehicle 100 may occur in response to, e.g., a user input provided to the user interface 120. Alternatively, the autonomous operation of the host vehicle 100 to cross the ditch may begin in response to a user input provided to a remote device 145 in wireless communication with the host vehicle 100.

Prior to crossing the ditch, regardless of whether the host vehicle 100 is autonomously or manually operated, the sensors 110 may sense the width and depth of the ditch, and the processor 130 may process the outputs of the sensors 110 to determine the target up and down slope of the ditch. The processor 130 may further compare the approaching and departure angles of the host vehicle 100 to the down and up slope of the ditch to determine if the active suspension system 115 can make the appropriate adjustments to traverse the ditch. If so, the processor 130 may plan a crossing path. If the active suspension system 115 cannot be adjusted appropriately, the processor 130 may seek an alternate path (i.e., cross the ditch at a different location that is more favorable to the abilities of the host vehicle 100).

With the crossing path identified, the processor 130 outputs control signals to the active suspension system 115. The signals may be used to facilitate traction buildup, namely, turning the traction control to the ditch crossing mode to allow more efficient traction management, including locking the differential and increasing the throttle slightly if the wheels start to spin. Moreover, the processor 130 may coordinate actuations of the throttle and braking for wheels on the ground while raising remaining wheels as needed and as appropriate. The processor 130 may regulate vehicle speed through the automatic cruise control system by selecting a slow target speed profile that is predefined for the ditch crossing mode. The processor 130 can further output signals to the autonomous mode controller 140 that can navigate the autonomous vehicle through the path while the processor 130 regulates tracking error. The tracking error may be defined as a difference of the actual position of the host vehicle 100 relative to the target path.

Figure 3B:
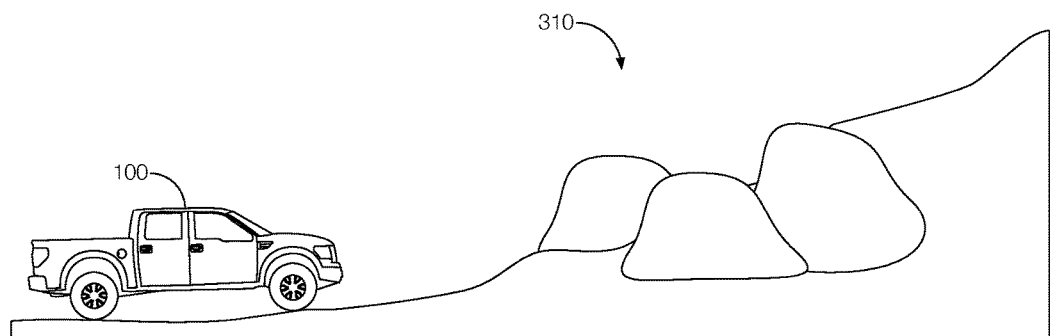

FIG. 3B illustrates an example rock-crawling scenario 310, which occurs when the host vehicle 100 approaches boulders, foothills, rock piles, sloped trails, or the like. The rock-crawling scenario may be detected by one or more sensors 110. In response to detecting such a scenario, the vehicle system 105 may operate in a rock-crawling mode. That is, the processor 130 may output signals to limit the speed of the host vehicle 100 to a low bound via the cruise control system. The processor 130 may further output signals to adjust the active suspension system 115 for increased vehicle articulation, which could include pushing the vehicle wheels down (i.e., raising the chassis), especially if the chassis is stuck by a large rock.

If the host vehicle 100 is approaching a large rock, the processor 130 may output signals to the active suspension system 115 to raise any negotiating wheels before the host vehicle 100 arrives at the rock to facilitate the wheel crawling. The processor 130 may also output signals to simultaneously actuate the braking system, throttle system, steering system, and raising of the wheels as appropriate to traverse the rock. For example, if the processor 130 determines that a wheel is stuck in a lower rock, it may output signals to raise the stuck wheel. Moreover, the processor 130 may output signals to adjust the ride height and enable four-wheel drive, if equipped.

The rock-crawling mode may be initiated in response to a user input provided to the user interface 120 or a remote device 145. Thus, the vehicle system 105 may operate the host vehicle 100 in the rock-crawling mode regardless of whether the host vehicle 100 is manually or autonomously operated, and further, the vehicle system 105 may operate the host vehicle 100 in the rock-crawling mode autonomously with or without passengers in the host vehicle 100.

Figure 3C:
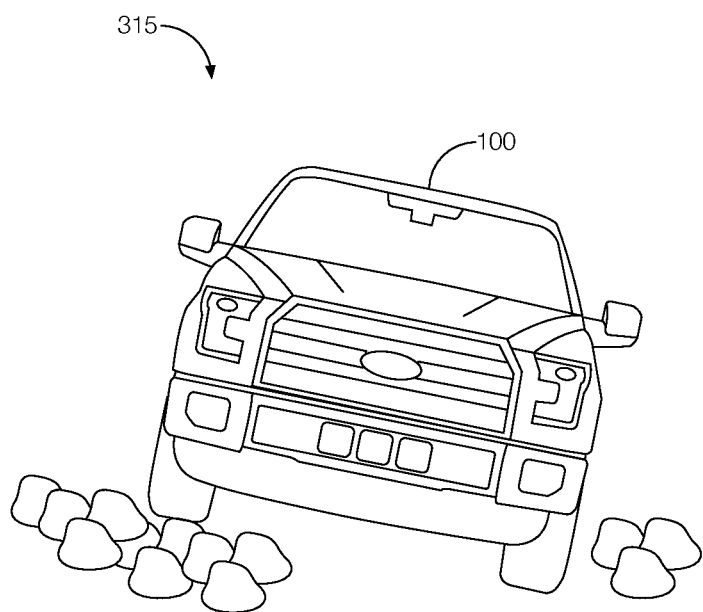
Figure 3D:
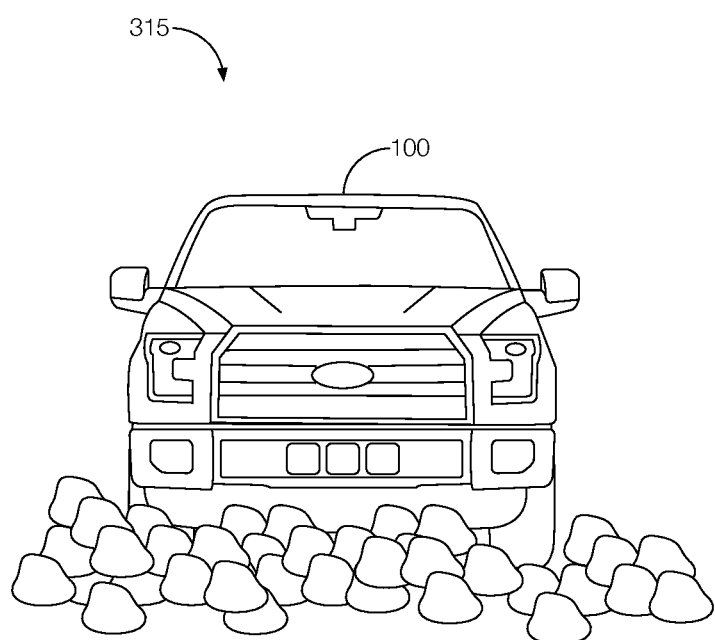

FIGS. 3C-3D illustrate example ground clearance avoidance scenarios 315, which occur when the host vehicle 100 approaches smaller objects in its path. "Smaller objects" refers to objects that are an obstacle for the host vehicle 100 to overcome but are not large enough to trigger the rock-crawling mode. For instance, such objects may include objects smaller than a boulder but individually or collectively larger than the vehicle's ground clearance. Thus, the ground clearance avoidance mode may be initiated when the sensors 110 detect rocks, stumps, tree trunks, or other smaller objects that individually or collectively are larger than the vehicle's ground clearance height.

When considering the scenarios of FIGS. 3C and 3D, the processor 130 may perform a feasibility assessment that considers the ride height and roll-over propensity, among other considerations, of the host vehicle 100. If the processor 130 determines that the objects can be traversed, the processor 130 may output the appropriate control signals to the active suspension system 115 to, e.g., simultaneously adjust the ride height and suspension dampening. The processor 130 may output signals associated with the height adjustment to change the ride height at the wheel right before it negotiates the high point of the obstacle. The processor 130, therefore, may implement a variable profile to provide smoother operation and reduce the risk of a roll-over. The processor 130 may further plan a path to help guide the driver during manual operation of the host vehicle 100 (i.e., a recommended path) or that may be used to autonomously navigate the host vehicle 100 through the obstacle. Further, for autonomous operation, the processor 130 may output signals to control the cruise control system in accordance with a low target speed profile.

As shown in FIG. 3C, the rocks are collectively greater than the ride height of the host vehicle 100, but the host vehicle 100 is able to drive over them without issue. Thus, in response to the sensors 110 detecting that the rocks exceed the ground clearance height of the host vehicle 100, the processor 130 may plan a path that involves directing the host vehicle 100 around the rocks. If that is not possible or feasible, the processor 130 may plan a path where the wheels simply drive over the rocks. The processor 130 may output signals to the active suspension system 115 and cruise control system to control the wheel height, dampening settings, etc.

FIG. 3D illustrates a scenario where the host vehicle 100 cannot go around the rocks, or at least the path through the rocks is less clear. In this instance, the sensors 110 may detect the rocks at a height greater than the ground clearance height of the host vehicle 100, and the processor 130 may output signals to the active suspension system 115 to adjust the ground clearance height (e.g., raise the chassis) so that the host vehicle 100 can traverse the obstacle without the rocks scraping the bottom of the host vehicle 100. Alternatively, the processor 130 may, using the outputs of the sensors 110, seek out an alternate path to avoid the rocks altogether. As with the other modes discussed above, the ground clearance avoidance mode may be initiated in response to a user input provided to the user interface 120 or a remote device 145.

Figure 4:
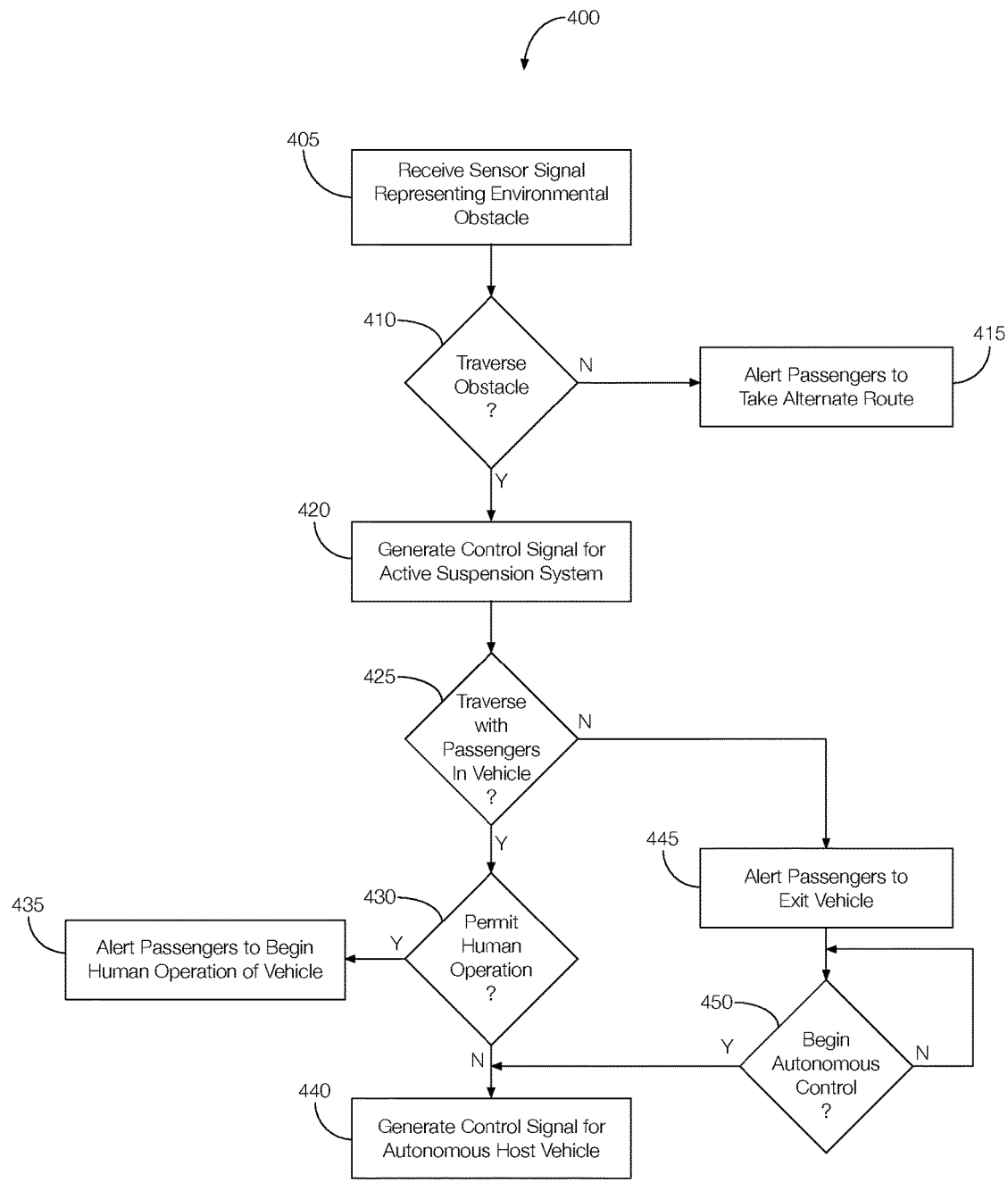
FIG. 4 is a flowchart of an example process that may be executed by the vehicle system when faced with an off-road environmental obstacle.

FIG. 4 is a flowchart of an example process 400 that may be executed by the vehicle system 105 to detect and traverse environmental obstacles.

At block 405, the vehicle system 105 receives one or more sensor signals representing environmental obstacles. The sensor signals may be output by one or more of the sensors 110 and may represent the presence of an environmental obstacle. For example, the sensor signal may be generated in response to image processing that detects large rocks (i.e., boulders), stumps, tree trunks, or other large objects, smaller rocks (i.e., smaller than a boulder but individually or collectively larger than the vehicle's ground clearance) or other smaller objects that individually or collectively are larger than the vehicle's ground clearance, or the like. The sensor signals may be received by the processor 130.

At decision block 410, the vehicle system 105 determines whether the host vehicle 100 can traverse the detected environmental obstacle. That is, the processor 130 may consider whether the active suspension system 115 can make the appropriate adjustments to overcome the detected environmental obstacle. This may include the processor 130 predicting the vehicle's path over or through the environmental obstacle while considering factors such as roll-over propensity, traction loss, and other risk factors associated with traversing the environmental obstacle. If the risk factors, as determined by the processor 130, are too high (e.g., quantitatively above a maximum threshold), the process 400 may proceed to block 415. If the risk factors, as determined by the processor 130, are lower (e.g., quantitatively below the maximum threshold), the process 400 may proceed to block 420.

At block 415, the vehicle system 105 alerts the passengers to take an alternate route. That is, the processor 130 may generate the alert and command the user interface 120 to present the alert to the occupants.

At block 420, the vehicle system 105 generates a control signal for the active suspension system 115. The control signals may facilitate traction buildup to, e.g., allow more efficient traction management, including locking the differential and increasing the throttle slightly if the wheels start to spin. Other control signals may increase vehicle articulation, which could include pushing the vehicle wheels down (i.e., raising the chassis), adjust the ride height, and adjust the suspension dampening. Some adjustments, such as adjusting the ride height may be made to the host vehicle 100 as a whole while others may be made only to particular wheels (e.g., adjusting a particular wheel height). Further, the vehicle system 105 may simultaneously output multiple control signals to, e.g., simultaneously actuate the braking, throttle, steering, raising of the wheels, etc.

At decision block 425, the vehicle system 105 determines whether the host vehicle 100 should attempt to traverse the environmental obstacle with passengers present. For instance, the processor 130 may consider the risk factors, discussed above, relative to an intermediate threshold which indicates a less risky maneuver over or through an environmental obstacle than a maneuver that exceeds the maximum threshold. If the processor 130 determines that the risk factors are quantitatively below the maximum threshold but above an intermediate threshold, the processor 130 may determine that the environmental obstacle should only be attempted autonomously and only after the passengers have exited the host vehicle 100. In such instances, the process 400 may proceed to decision block 430. If the processor 130 determines that the risk factors are quantitatively below the intermediate threshold, the processor 130 may permit manual or autonomous operation of the host vehicle 100 through the environmental obstacle, and the process 400 may proceed to block 445.

At decision block 430, the vehicle system 105 determines whether to allow manual operation of the host vehicle 100 through the environmental obstacle. For instance, the processor 130 may determine that human operation of the host vehicle 100 is permissible if the risk factors are quantitatively below the intermediate threshold. In such instances, the process 400 may proceed to block 435. Otherwise, if the risk factors are quantitatively below the intermediate threshold, or if the occupants do not wish to manually operate the host vehicle 100 over or through the obstacle as indicated by a user input provided to the user interface 120, the process 400 may proceed to block 440.

At block 435, the vehicle system 105 may alert the occupants that manual operation of the host vehicle 100 is permitted. The processor 130 may generate the alert and command the user interface 120 to present the alert to the occupants via the user interface 120. If the driver wishes to manually operate the host vehicle 100 through or over the environmental obstacle, the process 400 may proceed to block 405. If the driver prefers for the host vehicle 100 to be autonomously navigated through or over the environmental obstacle, the driver may provide a user input to the user interface 120 indicating as much, and the process 400 may proceed to block 440.

At block 440, the vehicle system 105 may generate control signals to autonomously control the host vehicle 100 over or through the environmental obstacle. That is, the processor 130 may generate and output signals to the autonomous mode controller 140 that command the autonomous mode controller 140 to autonomously operate the host vehicle 100 over or through the environmental obstacle. The signals output by the processor 130 may define a particular path and a particular speed to be applied when navigating over or through the obstacle. The processor 130 or the autonomous mode controller 140 may generate signals to control the steering, braking, and acceleration while the host vehicle 100 is autonomously operated. The process 400 may proceed to block 405 after the host vehicle 100 traverses the environmental obstacle.

At block 445, the vehicle system 105 may alert the passengers to exit the host vehicle 100. That is, the processor 130 may generate the alert and command the user interface 120 to present the alert to the passengers. The alert may instruct the passengers to exit the host vehicle 100 and to, e.g., provide a user input to the remote device 145 when all passengers have exited the host vehicle 100 and are ready for the host vehicle 100 to autonomously traverse the environmental obstacle.

At decision block 450, the vehicle system 105 may determine whether it can begin autonomous control of the host vehicle 100. The processor 130, for instance, may decide to begin autonomous control of the host vehicle 100 after it confirms that all passengers have exited the host vehicle 100 and after it has received a user input, provided via a remote device 145 (e.g., a fob, cell phone, etc.) and transmitted to the processor 130 via the communication interface 125, instructing the host vehicle 100 to proceed autonomously. The processor 130 may determine that the passengers have exited the host vehicle 100 in accordance with signals output by an occupant detection system. If the passengers have exited the host vehicle 100 and if the user input is received, the process 400 may proceed to block 440. Otherwise, the process 400 may repeat block 450 until at least those two criteria are simultaneously met. This, therefore, is one example of a circumstance in which the autonomous operation of the host vehicle 100 may occur only after all passengers have exited the host vehicle 100.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a processor with access to a memory storing instructions executable by the processor, the instructions including:

determining whether an autonomous host vehicle can traverse an environmental obstacle; and if the autonomous host vehicle can traverse the environmental obstacle:

controlling an active suspension system in accordance with the environmental obstacle, and controlling the autonomous host vehicle to traverse the environmental obstacle;

determining whether passengers should exit the autonomous host vehicle prior to the autonomous host vehicle traversing the environmental obstacle; and generating an alert if the passengers should exit the autonomous host vehicle prior to the autonomous host vehicle traversing the environmental obstacle.

2. The vehicle system of claim 1, wherein the instructions include presenting the alert to the passengers prior to the autonomous host vehicle traversing the environmental obstacle.

3. The vehicle system of claim 1, wherein the instructions include receiving a user input authorizing the autonomous host vehicle to traverse the environmental obstacle.

4. The vehicle system of claim 3, wherein controlling the autonomous host vehicle to traverse the environmental obstacle occurs in response to the user input authorizing the autonomous host vehicle to traverse the environmental obstacle.

5. The vehicle system of claim 1, wherein the instructions include determining whether all passengers have exited the autonomous host vehicle.

6. The vehicle system of claim 5, wherein controlling the autonomous host vehicle to traverse the environmental obstacle occurs after all passengers have exited the autonomous host vehicle.

7. A vehicle system comprising:

a sensor that detects an environmental obstacle and outputs an obstacle detection signal representing a presence of the environmental obstacle; and a processor programmed to receive the environmental obstacle detection signal, determining whether an autonomous host vehicle can traverse the environmental obstacle, and if the autonomous host vehicle can traverse the environmental obstacle:

control an active suspension system in accordance with the environmental obstacle, and control the autonomous host vehicle to traverse the environmental obstacle;

wherein the processor is further programmed to determine whether passengers should exit the autonomous host vehicle prior to the autonomous host vehicle traversing the environmental obstacle.

8. The vehicle system of claim 1, wherein the processor is programmed to generate an alert if the passengers should exit the autonomous host vehicle prior to the autonomous host vehicle traversing the environmental obstacle.

9. The vehicle system of claim 8, further comprising a user interface that presents the alert to the passengers prior to the autonomous host vehicle traversing the environmental obstacle.

10. The vehicle system of claim 7, wherein the processor is programmed to receive a user input authorizing the autonomous host vehicle to traverse the environmental obstacle.

11. The vehicle system of claim 10, wherein the processor is programmed to control the autonomous host vehicle to traverse the environmental obstacle in response to receiving the user input authorizing the autonomous host vehicle to traverse the environmental obstacle.

12. The vehicle system of claim 11, further comprising a user interface that receives the user input and provides the user input to the processor.

13. The vehicle system of claim 11, wherein the user input is received wirelessly from a remote device.

14. The vehicle system of claim 7, wherein the processor is programmed to determine whether all passengers have exited the autonomous host vehicle.

15. The vehicle system of claim 14, wherein the processor is programmed to control the autonomous host vehicle to traverse the environmental obstacle after all passengers have exited the autonomous host vehicle.

16. A method comprising:

receiving a sensor signal representing a presence of an environmental obstacle;

determining that an autonomous host vehicle can traverse an environmental obstacle;

controlling an active suspension system in accordance with the environmental obstacle, and controlling the autonomous host vehicle to traverse the environmental obstacle;

determining whether passengers should exit the autonomous host vehicle prior to the autonomous host vehicle traversing the environmental obstacle; and generating an alert if the passengers should exit the autonomous host vehicle prior to the autonomous host vehicle traversing the environmental obstacle.

17. The method of claim 16, further comprising:

presenting the alert to the passengers prior to the autonomous host vehicle traversing the environmental obstacle; and determining whether all passengers have exited the autonomous host vehicle, wherein controlling the autonomous host vehicle to traverse the environmental obstacle occurs after all passengers have exited the autonomous host vehicle.

18. The method of claim 17, wherein controlling the active suspension system includes simultaneously actuating a braking system, a throttle system, a steering system, and raising at least one vehicle wheel to traverse the environmental obstacle.

* * * * *